(12) United States Patent
Pakniat et al.

(10) Patent No.: US 11,096,104 B2
(45) Date of Patent: Aug. 17, 2021

(54) METHOD AND APPARATUS FOR HANDLING MOBILITY MEASUREMENTS FOR A USER EQUIPMENT

(71) Applicant: Telefonaktiebolaget LM Ericsson (publ), Stockholm (SE)

(72) Inventors: Parisa Pakniat, Norrköping (SE); Icaro L. J. da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 342 days.

(21) Appl. No.: 16/081,482

(22) PCT Filed: Aug. 9, 2018

(86) PCT No.: PCT/SE2018/050801
§ 371 (c)(1),
(2) Date: Aug. 31, 2018

(87) PCT Pub. No.: WO2019/032025
PCT Pub. Date: Feb. 14, 2019

(65) Prior Publication Data
US 2020/0178130 A1 Jun. 4, 2020

Related U.S. Application Data

(60) Provisional application No. 62/544,155, filed on Aug. 11, 2017.

(51) Int. Cl.
*H04W 36/00* (2009.01)
*H04L 5/00* (2006.01)
*H04W 36/30* (2009.01)

(52) U.S. Cl.
CPC ....... *H04W 36/0094* (2013.01); *H04L 5/0048* (2013.01); *H04W 36/00837* (2018.08); *H04W 36/30* (2013.01)

(58) Field of Classification Search
CPC ....... H04W 36/0094; H04W 36/00837; H04W 36/30; H04W 36/0085; H04L 5/0048
See application file for complete search history.

(56) References Cited

U.S. PATENT DOCUMENTS

2015/0139005 A1* 5/2015 Tsuboi ................. H04L 5/0053
370/252
2018/0184320 A1 6/2018 Shi et al.
2020/0145863 A1* 5/2020 Yang ..................... H04W 16/28

FOREIGN PATENT DOCUMENTS

| JP | 2013243623 A | 12/2013 |
|---|---|---|
| JP | 2014534667 A | 12/2014 |
| WO | 2016093753 A1 | 6/2016 |

OTHER PUBLICATIONS

Unknown, "Combined RSRP & RSRQ quantities report triggering", 3GPP TSG RAN WG2 #62bis; R2-083546; Warsaw, Poland, Jun. 30-Jul. 4, 2008, 1-3pp.

(Continued)

*Primary Examiner* — Marisol Figueroa
(74) *Attorney, Agent, or Firm* — Murphy, Bilak & Homiller, PLLC

(57) ABSTRACT

The embodiments herein relate to a method, performed by a network node (110), for configuring mobility measurements to be performed by a User Equipment, UE, (120). The network node (110) sends a configuration message to the UE (120). The configuration message comprises a plurality of measurement offsets associated to a single measurement object. The measurement offsets indicate offset values for triggering a measurement report. Each of the plurality of measurement report triggering offsets being related to a respective measurement. The embodiments herein further relate to a method, performed by the UE (120), for performing mobility measurements. The UE (120) receives a plurality of measurement offsets associated to a single mea- (Continued)

surement object, wherein the measurement offsets indicates offset values for triggering a measurement report, and wherein each of the plurality of measurement offsets is related to a respective measurement. The UE (120) further performs a mobility measurement process taking the measurement offset into account for triggering a measurement report transmission.

27 Claims, 6 Drawing Sheets

(56) References Cited

OTHER PUBLICATIONS

Unknown, "On the need for thresholds in cell quality derivation in NR", 3GPP TSG RAN WG2 NR AdHoc#2; Tdoc R2-1707284; Qingdao, P.R. of China, Jun. 27-29, 2017, 1-4pp.
Unknown, "Remaining issues on cell quality derivation from N beams", 3GPP TSG RAN WG2#NR_AdHoc#2; R2-1706661; Qingdao, China, Jun. 27-29, 2017, 1-3pp.
"3GPP TS 36.304 V14.3.0", 3rd Generation Partnership Project; Technical Specification Group Radio Access Network; Evolved Universal Terrestrial Radio Access (E-UTRA); User Equipment (UE) procedures in idle mode (Release 14), Jun. 2017, pp. 1-49.
"3GPP TS 36.331 V14.3.0", 3rd Generation Partnership Project; Technical Specification Group Radio Access Network; Evolved Universal Terrestrial Radio Access (E-UTRA); Radio Resource Control (RRC); Protocol specification (Release 14), Jun. 2017, pp. 1-745.
"3GPP TS 38.331 V0.0.4," NR; Radio Resource Control (RRC); Protocol specification, Jun. 2017, pp. 1-22.

\* cited by examiner

METHOD AND APPARATUS FOR HANDLING MOBILITY MEASUREMENTS FOR A USER EQUIPMENT

TECHNICAL FIELD

Embodiments herein relate to mobility measurements for a User Equipment (UE) in wireless communication systems, such as cellular networks. In particular, the embodiments herein relate to a network node, a UE and methods performed therein.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, an evolved NodeB (eNB), or G-UTRAN NodeB (gNB) as denoted in New Radio (NR), which may also be referred to as a Fifth Generation (5G) network. A service area or cell area is a geographical area where radio coverage is provided by the radio network node. The radio network node communicates over an air interface, which may also be referred to as a channel or a radio link, operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a 5G network also referred to as 5G NR. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

UE measurements, which may also be referred to as mobility measurements or Radio Resource Management (RRM) measurements, are used to monitor and report the serving cell and neighboring cell(s) signal level and quality, to assist the radio network to choose a suitable serving cell for the UE. There may be different reasons, which may also be referred to as a plurality of reasons to relocate the UE from a current serving cell to another cell, such as e.g. coverage reasons, traffic load level or support of a specific service.

The UE measurements are configured by the radio network, e.g. via a radio network node, and several parameters are involved to specify the conditions for measurements and reporting that the UE shall use. In LTE, UE measurement configurations provided by E-UTRAN to the UE are specified in the 3GPP TS 36.331 v. 14.3.0 E-UTRA; Radio Resource Control (RRC) Protocol Specification.

A corresponding specification, 3GPP TS 38.331 v. 0.0.4 NR RRC Protocol Specification, is currently being prepared for NR.

The measurement configuration framework in NR may be based on the framework from LTE, described in 3GPP TS 38.331 v. 0.0.4. In NR, the network may configure a UE being in RRC_CONNECTED mode to perform cell level and beam level measurements and report them in accordance with the measurement configuration. The measurement configuration may be provided by means of dedicated signaling.

The network may, e.g. by means of a radio network node, configure the UE to perform the following types of measurements:

Intra-frequency measurements: measurements at the downlink carrier frequency(ies) of the serving cell(s).

Inter-frequency measurements: measurements at frequencies that differ from any of the downlink carrier frequency(ies) of the serving cell(s).

Inter-Radio Access Technology (RAT) measurements of Evolved Universal Terrestrial Radio Access (E-UTRA) frequencies: measurements are performed on a RAT that differs from the RAT of the serving cell.

The measurement configuration may comprise the following parameters:

1. Measurement objects: A list of objects on which the UE shall perform the measurements. The measurement objects may hereinafter be referred to as measObjects.

For inter-RAT E-UTRA measurements a measurement object may be a single E-UTRA downlink carrier frequency.

2. Reporting configurations: A list of reporting configurations where there may be one or multiple reporting configurations per measurement object. The reporting configurations may hereinafter be referred to as reportConfig(s). Each reporting configuration comprises of the following:

Reporting criterion: The criterion that triggers the UE to send a measurement report which may either be event triggered or periodical. The criterion also includes a trigger quantity, such as e.g. a Reference Signal Received Power (RSRP), Reference Signal Received Quality (RSRQ) or Signal-to-Interference-plus-Noise Ratio (SINR).

Reference Signal (RS) type: The RS to be considered by the UE for cell level and beam level measurements.

Reporting format: The cell level quantities that the UE includes in the measurement report (RSRP and/or RSRQ and/or SINR) and associated information, such as e.g. number of cells).

3. Measurement identities: A list of measurement identities where each measurement identity links one measurement object with one reporting configuration. By configuring multiple measurement identities, it may be possible to link more than one measurement object to the same reporting configuration, as well as to link more than one reporting configuration to the same measurement object. The measurement identity may also be included in the measurement report that triggered the reporting, serving as a reference to the network. The measurement identities may hereinafter be referred to as measObjectId(s).

4. Quantity configurations: One quantity configuration is configured per Radio Access Technology (RAT) type. The quantity configuration defines the measurement quantities and associated filtering used for all event evaluation and related reporting of that measurement type.

5. Measurement gaps: Periods that the UE may use to perform measurements, i.e. no Uplink (UL) and/or Downlink (DL) transmissions are scheduled.

In LTE, the measurement configuration provides the UE with reporting configurations, containing triggering events associated to a measurement object on which the UE shall perform the measurements. Associated to each report configuration, the network node may select one trigger quantity, which is a parameter which the UE performs the measurements for. The network may also set a measurement report triggering offset for each measurement object.

However, there exists a need for improving the UE measurements in order to further assist the radio network in choosing a suitable serving cell for the UE.

SUMMARY

It is an object of embodiments herein to enhance performance of a wireless communications network, in particular by providing a method for configuring measurement triggering offsets for a UE.

According to a first aspect of the embodiments herein the object is achieved by a method performed by a network node, for configuring mobility measurements for a UE. The network node sends a configuration message to the UE. The configuration message comprises a plurality of measurement offsets associated to a single measurement object, wherein the measurement offsets indicates offset values for triggering a measurement report, and wherein each of the plurality of measurement offsets being related to a respective measurement.

According to a second aspect of the embodiments herein, the object is achieved by a network node, for performing a method for configuring mobility measurements for a UE. The network node is configured to send a configuration message to the UE. The configuration message comprises a plurality of measurement offsets associated to a single measurement object, wherein the measurement offsets indicate offset values for triggering a measurement report, and wherein each of the plurality of measurement offsets is related to a respective measurement.

According to a third aspect of the embodiments herein, the object is achieved by a method, performed by a UE for performing mobility measurements. The UE receives a configuration message from a network node. The configuration message comprises a plurality of measurement offsets associated to a single measurement object, wherein the measurement offsets indicates offset values for triggering a measurement report, and wherein each of the plurality of measurement offsets being related to a respective measurement. The UE further performs a mobility measurement process taking the measurement offset into account for triggering a measurement report transmission.

According to a fourth aspect of the embodiments herein, the object is achieved by a UE for performing mobility measurements. The UE is configured to receive a configuration message from a network node. The configuration message comprises a plurality of measurement offsets associated to a single measurement object, wherein the measurement offsets indicates offset values for triggering a measurement report, and wherein each of the plurality of measurement offsets is related to a respective measurement. The UE is further configured to perform a mobility measurement process taking the measurement offset into account for triggering a measurement report transmission.

According to a fifth aspect of the embodiments herein, the object is achieved by a computer program product comprising instructions, which, when executed on at least one processor, cause the at least one processor to carry out the method according to the first and/or third aspect of the embodiments herein.

A computer-readable storage medium, having stored thereon a computer program product comprising instructions which, when executed on at least one processor, cause the at least one processor to carry out the method according the first and/or third aspect of the embodiments herein.

By configuring a plurality of measurement offsets, such as e.g. cell individual offsets and frequency offsets, the following benefits are achieved:

A more intuitive way to encode parameters, such as measurement offsets, in the specifications is provided.

The measurement offsets can improve mobility robustness optimization (MRO), in order to minimize the connection drops and bitrate dips. Different offsets can be set per trigger quantity and/or per RS-type in order to optimize the result of the MRO. The solution according to the embodiments herein provide better optimization features and therefore better network performance can be achieved.

By configuring individual measurement offsets, an optimized offset for one purpose, such as for example for MRO, does not negatively impact measurements for other purposes, such as e.g. load balancing or service triggered mobility. Thereby a better network performance can be achieved.

The embodiments herein further allow for fine tuning of mobility based on beam level measurement, for both manual and automatic methods, which also results in a better performance for the network and the UE.

The measurement offsets are associated to a single measurement object, and indicate offset values for triggering a measurement report, and may thus herein also be referred to as measurement report triggering offsets.

DETAILED DESCRIPTION OF PREFERRED EMBODIMENTS

Figure 1:
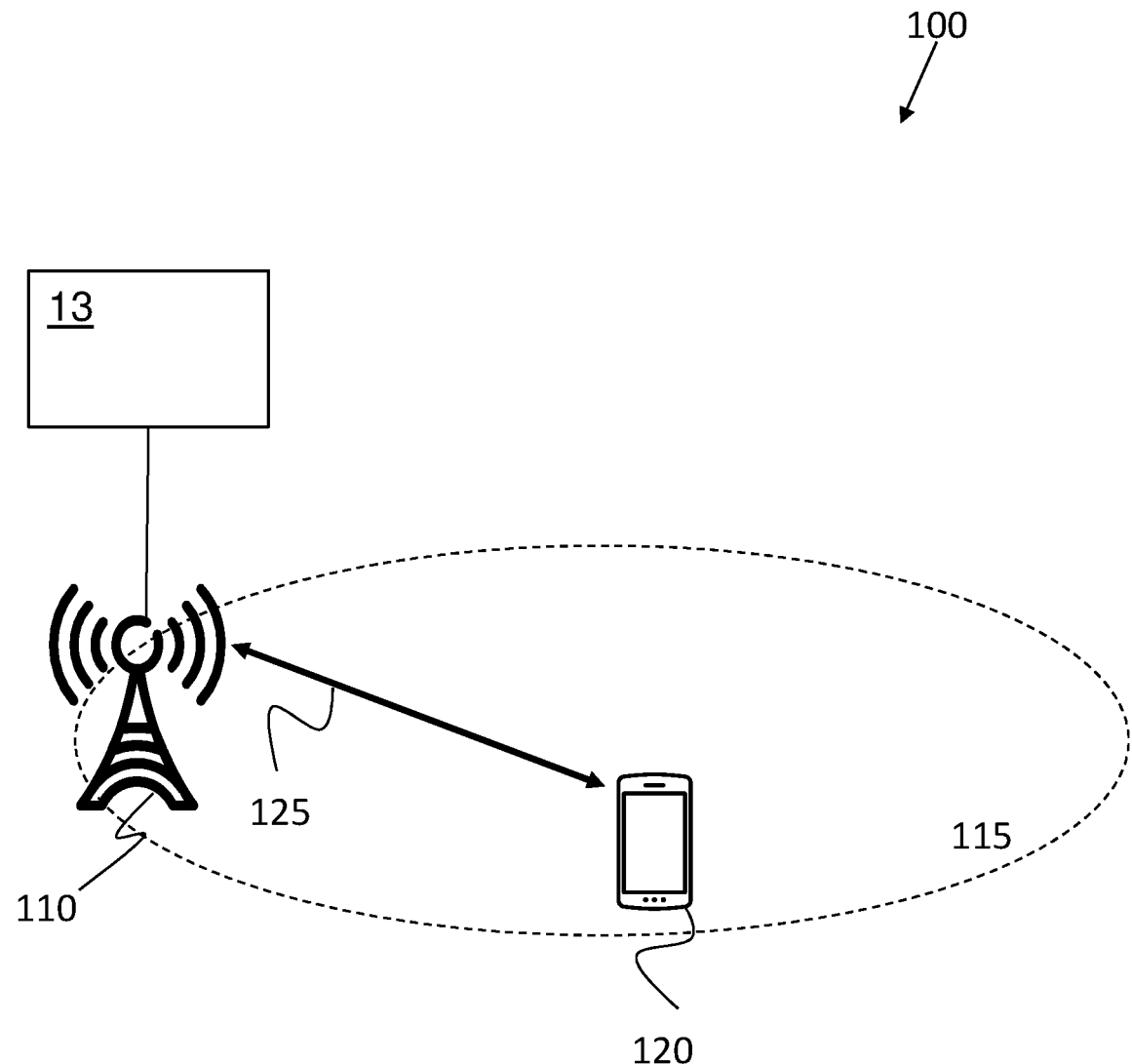
FIG. 1 is a schematic block diagram illustrating embodiments of a wireless communications network.

According to the current LTE specifications, when the communications network configures the measurement reporting for a UE, the communication network sets one offset for each measurement object. Hence, the same offset is set regardless of the triggerQuantity associated to an event that has been configured for the UE. In other words, a first event A1 based on e.g. RSRP quantity has the same cell-specific offset, such as a measurement offset, configured as a second event, such as e.g. A1 or A2, even though the second event is based on e.g. RSRQ. A further problem with the known solutions may occur when several report configurations are connected to the same measurement object. Different report configurations may be related to different purposes, such as for example coverage triggered mobility or load balancing purposes, and hence have different requirements on the measurement reporting. There may however be multiple events associated to the same measurement object, such as e.g. comprising the same list of cells where offsets have been set, and these multiple events may have different trigger quantities.

According to current LTE specification 3GPP TS 36.331 v. 14.3.0, when E-UTRAN configures UE measurements, it is possible to assign offsets for specific frequency and/or specific cells, to be considered in event measurements. Reference is e.g. made to a frequency specific offset of the frequency of the neighbour cell (Ofn), a cell specific offset of the neighbor cell (Ocn), a frequency specific offset of the frequency of a Primary Cell (PCell) and/or Primary Secondary Cell (PSCell) (Ofp) and a cell specific offset of the PCell/PSCell (Ocp), in events such as A3, A4, A5, A6, B1, B2, etc. as listed below:

A1 Serving becomes better than threshold
A2 Serving becomes worse than threshold
A3 Neighbour becomes offset better than PCell
A4 Neighbour becomes better than threshold
A5 PCell becomes worse than threshold1 and neighbour becomes better than threshold2
A6 Neighbour becomes offset better than SCell
C1 Channel-State Information (CSI)-RS resource becomes better than threshold
C2 CSI-RS resource becomes offset better than reference CSI-RS resource
B1 Inter RAT neighbour becomes better than threshold
B2 PCell becomes worse than threshold1 and inter RAT neighbour becomes better than threshold2
V1 The channel busy ratio is above a threshold
V2 The channel busy ratio is below a threshold In LTE the offsets signaled to the UE are defined per measurement object. The measurement object i.e. a frequency or a number of cells on a given carrier frequency which the UE is requested to perform measurements on. The definition of a measurement object in LTE from 3GPP TS 36.331 v. 0 is disclosed in Appendix 1 herein. A part of the cell-specific offset configuration that may be set using the measurement object is a Q-OffsetRange. The Q-OffsetRange may be used to indicate a cell, a CSI-RS resource or a frequency specific offset to be applied when evaluating candidate cells for cell re-selection or when evaluating triggering conditions for measurement reporting. The Q-OffsetRange is indicated in decibel (dB). A value dB-24 corresponds to −24 dB, dB-22 corresponds to −22 dB and so on.

| Q-OffsetRange information element |
| --- |
| -- ASN1START<br>Q-OffsetRange ::=     ENUMERATED {<br>    dB-24, dB-22, dB-20, dB-18, dB-16, dB-14,<br>    dB-12, dB-10, dB-8, dB-6, dB-4, dB-3,<br>    dB-2, dB-1, dB0, dB1, dB2, dB3, dB4, dB5,<br>    dB6, dB8, dB10, dB12, dB14, dB16, dB18,<br>    dB20, dB22, dB24}<br>-- ASN1STOP |

With the existing solution in LTE, if there are simultaneous measurements, such as for example two A5 report configurations, configured on the same measObjectId, such as e.g. the same neighbor frequency, one with RSRP and the other with RSRQ trigger quantity, the same offset value will be applied for both event evaluations which is not always the best behavior.

Although both A5 reports in the example above are configured with the same trigger quantity RSRP, they may be related to different purposes and an offset may not be desired to be used for both of them. Since different report configurations may be related to different purposes, such as for example coverage triggered mobility or load balancing purposes, it is desired to have different offsets for each report configuration.

In summary, the state-of-the-art solution does not allow the network to configure different offsets corresponding to, which may also be referred to as being configured for, different trigger measurement quantities, such as RSRP, RSRQ, SINR, etc.

The embodiments herein thus relate to a method for allowing the network node to configure the UE with multiple measurement offsets, which may herein also be referred to as measurement report triggering offsets or offsets, such as offsets for RSRP or RSRQ values associated to a same measurement object, which may be associated to a frequency to be measured, e.g. a carrier frequency indicated by an Absolute Radio-Frequency Channel Number (ARFCN).

Although the embodiments herein may primarily be defined for cell based measurements that may trigger events and measurement reporting, the principle of the embodiments herein may also be applied to beam level measurements.

The specification, 3GPP TS 38.331 v. 0.0.4 NR RRC Protocol Specification, may be partly similar to the E-UTRAN version where applicable.

In the embodiments herein, the multiple measurement report triggering offsets, which may comprise frequency specific offsets and cell specific offsets, may be configured in different levels of granularity, such as e.g.:
Per trigger quantity, e.g. an RSRP, an RSRQ and/or a SINR or any other quality related metric;
Per RS type that is configured, such as e.g. Synchronization Signal (SS) Block RS or Channel State Information Reference Signals (CSI-RS);
Per cell quality derivation parameters, such as e.g. a maximum number of beams to be averaged, an absolute threshold to select suitable beams for averaging, etc.
Or any combinations of these e.g.:
per trigger quantity of cell measurement (e.g. RSRP, RSRQ)

per trigger quantity of cell measurement and RS type (e.g. cell RSRP based on Synchronization Signal (SS) Block, cell RSRQ based on CSI-RS) etc.

The measurement offsets, which indicate offset values for triggering a measurement report, may e.g. be set to different values for each measurement identifier, i.e. one configured event (reportConfigNR) linked to one measurement object (measObjectNR). Hence, the measurement identifier is a combination of the configured event and the measurement object.

Current offset definitions per measurement object may be inherited from the similar offsets used in idle mode for cell reselection evaluation process. Those are referred to as q-OffsetCell (Parameter "Qoffsets,n" in 3GPP TS 36.304 v.14.3.0) and q-OffsetFreq (Parameter "Qoffsetfrequency" in 3GPP TS 36.304 v.14.3.0) which are broadcasted in SIB4 and SIB5. However, the current offset definitions per measurement object are only meant to be applied for RSRP measurements and for the specific purpose of cell reselection. Refer to R criteria definition in 3GPP TS 36.304 v.14.3.0. The same offsets may however also be applicable for "RSRP based coverage triggered mobility" in connected mode as well.

The embodiments herein relate to improving a configuration of frequency specific offsets and cell specific offsets used in RRM measurement, e.g. for NR measurements. This allows for a manual and automatic mobility optimization in cellular networks without impacting other network functions.

FIG. 1 illustrates a communication scenario in an exemplified wireless communication network 100, where at least some of the embodiments herein may be used. The wireless communication network 100 comprises one or more UEs 120. The UEs 120 may e.g. be mobile phones, smart phones, laptop computers, tablet computers, Machine-Type Communication (MTC) devices, mobile stations, stations (STA), or any other devices that can provide wireless communication and thus may also be referred to as a wireless device. The UE 120 may communicate via the wireless communication network 100, such as a Local Area Network (LAN), such as e.g. a Wi-Fi network, or a Radio Access Network (RAN), such as e.g. an Evolved Universal Terrestrial Radio Access Network (E-UTRAN) or a Fifth Generation (5G) RAN to one or more core networks (CN) 13 such as e.g. an Evolved Packet Core (EPC) or a 5th Generation Core (5GC). The wireless communication network 100 further comprises one or more network nodes 110, such as e.g. a radio access node e.g., a Wi-Fi access point or a radio base station (RBS), which in some networks may also be denoted, for example, a NodeB, an eNB, or a gNB as denoted in New Radio (NR). NR may also be referred to as 5th-Generation Wireless Systems (5G). Each of the one or more network node(s) 110 serves one or more coverage area(s) 115, which may also be referred to as e.g. a cell, a beam or a beam group. In order to determine the best available cell for the UE 120, the UE 120 may perform measurements, which may also be referred to as mobility measurements, in order to monitor and report the serving cell and neighboring cell(s) signal level and quality. The measurements may then be sent from the UE 120 to the network node 110 and may be used to assist the network node 110 to choose a suitable serving cell for the UE 120. There may be different reasons to relocate the UE 120 from a current serving cell to another cell, such as e.g. coverage reasons, traffic load level or support of a specific service. When a report is triggered to be sent by the UE 120 to the network node 110 it is called that an event has been fulfilled.

In the E-UTRA specification, the following procedural text relating to the Event A3 exists which concerns the UE actions related to "frequency specific offset" and "cell specific offset":

---

5.5.4.4  Event A3 (Neigbour becomes offset better than PCell/ PSCell)
The UE shall:
1>   consider the entering condition for this event to be satisfied when condition A3-1, as specified below is fulfilled;
1>   consider the leaving condition for this event to be satisfied when condition A3-2, as specified below, is fulfilled:
1>     if usePSCell of the corresponding reportConfig is set to true:
2>       us the PSCell for Mp, Ofp and Ocp;
1>     else
2>       use the PCell for Mp, Ofp and Ocp;

NOTE
The cell(s) that triggers the event is on the frequency indicated in the associated measObject which may be different from the frequency used by the PCell/PSCell.
Inequality A3-1 (Entering condition)
$Mn + Ofn + Ocn - Hys > Mp + Ofp + Ocp + Off$
Inequality A3-2 (Leaving condition)
$Mn + Ofn + Ocn + Hys < Mp + Ofp + Ocp + Off$
The variables in the formula are defined as follows:
Mn is the measurement result of the neighbouring cell, not taking into account any offsets.
Ofn is the frequency specific offset of the frequency of the neighbour cell (i.e. offsetFreq as defined within measObjectEUTRA corresponding to the frequency of the neighbour cell).
Ocn is the cell specific offset of the neighbour cell (i.e. cellIndividualOffset as defined within measObjectEUTRA corresponding to the frequency of the neighbour cell), and set to zero if not configured for the neighbour cell.
Mp is the measurement result of the PCell/ PSCell, not taking into account any offsets
Ofp is the frequency specific offset of the frequency od the PCell/ PSCell (i.e. offsetFreq as defined within measObjectEUTRA corresponding to the frequency of the PCell/ PSCell).
Ocp is the cell specific offset of the PCell/ PSCell (i.e. cellIndividualOffset as defined within measObjectEUTRA corresponding to the frequency od the PCell/ PSCell), and is set to zero if not configured for the PCell/ PSCell.
Hys is the hysteresis parameter for this event (i.e. hysteresis as defined within reportConfigEUTRA for this event).
Off is the offset parameter for this event (i.e. a3-Offset as defined within reportConfigEUTRA for this event).
Mn, Mp are expressed in dBm in case of RSRP, or in dB in case of RSRQ and RS-SINR.
Ofn, Ocn, Ofp, Ocp, Hys, Off are expressed in dB.

---

Similar texts are also available for the events A4, A5, A6, B1 and B2 as well.

Figure 2:
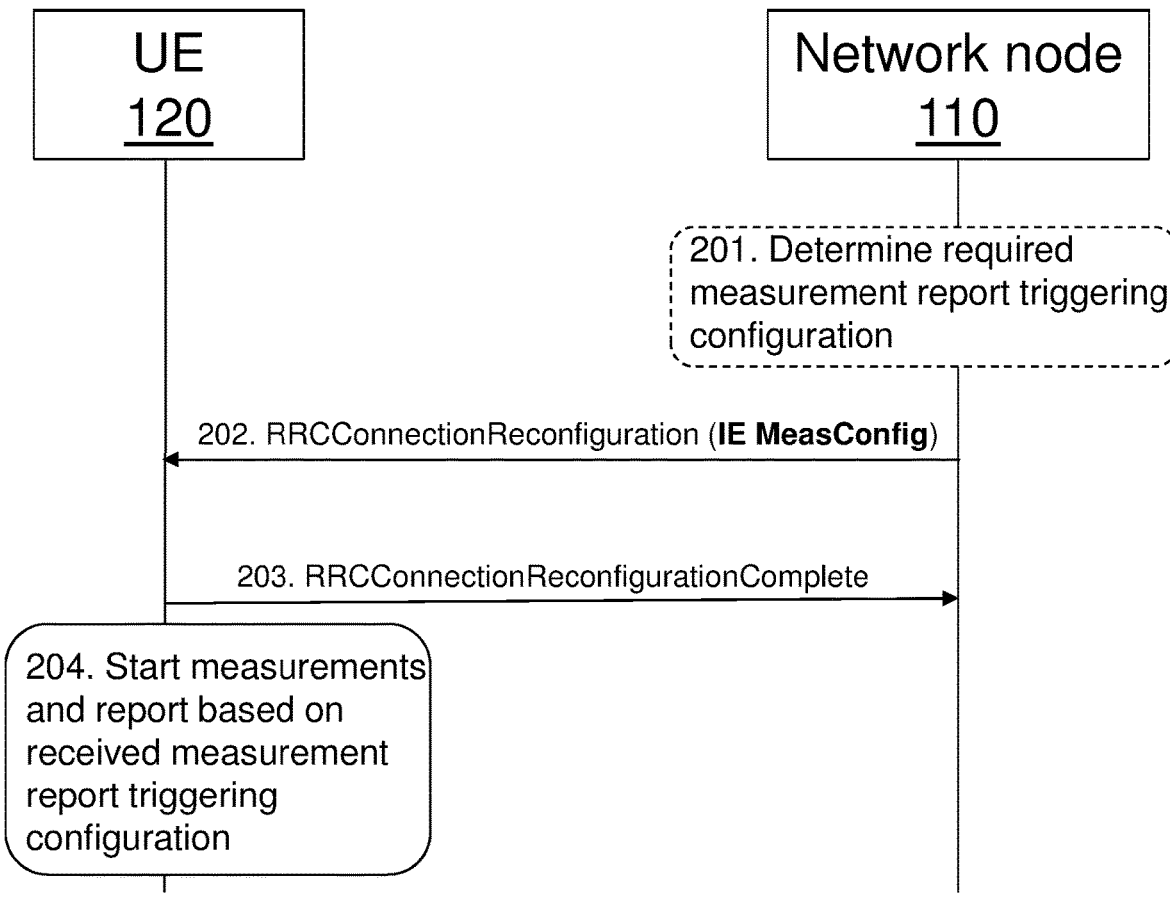
FIG. 2 is a signaling diagram illustrating the signaling required in order for the network node to configure UE measurements.

FIG. 2 shows the signaling involved when the network node 110, such as e.g. the eNB or the gNB, configures UE measurements through dedicated signaling using e.g. the RRCConnectionReconfiguration message. The measurements may also be configured via an RRCConnectionResume message (not shown in the figure). For NR the measurement configuration to the UE 120 may also be provided using other RRC message(s).

Action 201: The network node 110 may determine a measurement report triggering configuration required for the UE 120.

Action 202: The network node 110 sends a configuration message, such as the RRCConnectionReconfiguration message, the RRCConnectionResume message or any similar RRC message, to the UE 120. The configuration message comprises a plurality of measurement offsets associated to a single measurement object, e.g. quality. The measurement offsets indicate offset values for triggering a measurement report. Each of the plurality of measurement offsets being related to a respective measurement, e.g. a first offset for a first quality and a second offset for a second quality. In other words, each of the measurement offsets may be related to a different measurement.

Action 203: The UE 120 may perform a reconfiguration based on the received configuration message and may send an RRCConnectionReconfigurationComplete message to the network node 110 indicating that the reconfiguration has been completed.

Action 204: The UE 120 starts measurements, which may herein also be referred to as performs measurements, such as the mobility measurements for the UE 120. The mobility measurements may be reported by the UE 120 based on the received measurement offsets, which may herein also be referred to as a report triggering configuration. The measurement report may thus, when the measurement reaches a threshold plus the configured offset, be sent to the network node 110.

The embodiments disclosed herein may use the signaling sequence disclosed in FIG. 2 but proposes an update of the information Element (IE) MeasConfig contents as currently defined for EUTRAN.

According to the embodiments disclosed herein, the UE 120 may be requested to perform intra-frequency, inter-frequency and/or inter-RAT measurements. The UE 120 may be requested to perform multiple simultaneous measurements on different frequencies/RAT with different reporting criterion, such as e.g. periodical measurements or event measurements. Different reporting configurations may have different trigger quantities.

In addition, mobility measurements in NR have some differences compared to LTE. The cell quality for event triggering may e.g. be either based on CSI-RS or NR-Synchronization Signals (NR-SS) that may be configured independently per event and measurement object. In other words, the network 100, e.g. using the network node 110, may configure the UE 120 with one or more first events for NR-SS, such as e.g. event A4, and one or more second events for CSI-RS, such as e.g. event A3. In a further example the network node 110 may configure the UE 120 with the same event for CSI-RS and NR-SS but associated to different measurement objects. Hence, it is beneficial to be able to configure the offsets for SS and CSI independently, i.e. to respective, which may also be referred to as different values, even though these are related to the same measurement object.

According to the embodiments herein, different measurement report triggering offsets for different measurements may be signaled to the UE 120 from the network, such as e.g. by the network node 110.

The network may e.g. configure the plurality of measurement report triggering offsets in different levels of granularity, such as e.g.:

Per trigger quantity, such as e.g. RSRP, RSRQ, SINR or any other quality related metric;
Per RS type that is configured, such as e.g. SS Block RS or CSI-RS;
Per cell quality derivation parameters, such as e.g. the maximum number of beams to be averaged, the absolute threshold to select good beams for average, etc.
Or any combinations of these, such as e.g.:
per trigger quantity of cell measurement (e.g. RSRP, RSRQ)
per trigger quantity of cell measurement and RS type (e.g. cell RSRP based on SS Block, cell RSRQ based on CSI-RS)

In the highest degree of granularity, the network node 110 may set the measurement offsets triggering a measurement reporting to different values for each measurement identifier, such as e.g. one configured event (reportConfigNR) linked to one measurement object (measObjectNR).

Per TriggerQuantity

The network, such as e.g. the network node 110, may configure the UE 120 with one or multiple offsets per cell, wherein each of these offsets is associated with a given triggerQuantity. The trigger quantity may e.g. be RSRP, RSRQ, SINR or any quality measurement result.

The embodiment may be implemented by defining cell-specific offsets per reportConfig, wherein the offsets are associated to the configured triggerQuantity, which may also be defined per reportConfig. The network may further provide two or more reportConfig(s), each having a different triggerQuantity, e.g. a first reportConfig having RSRP as triggerQuantity and a second reportConfig having RSRQ as triggerQuantity. For each of the reportConfig(s), the network node 110 may set different offsets per cell. The cell list may e.g. be comprised in the measObject associated to the reportConfig or within the reportConfig.

Another way to implement the embodiment may be by defining cell-specific offsets within the measurement object per triggerQuantity. In other words, instead of a single offset to be applied to any trigger quantity that may be set in any linked reportConfig, the network may provide K offsets instead, one for each triggerQuantity that may be set in the reportConfig. For example, if it in NR is possible to set e.g. RSRP, RSRQ or SINR as a trigger quantity, the measurement object may comprise a plurality of possible offsets, such as e.g. three possible offsets, for each cell. Thus, the UE 120 may trigger a measurement reporting based on different measurement report triggering offsets for different trigger quantities.

Per RS Type

In NR, cell measurement results may be computed based on different type of reference signals: SS Block RS, such as e.g. NR-Secondary Synchronization Signal (NR-SSS) and/or NR-Primary Sidelink Synchronization Signals (NR-PSSS) and/or NR-Demodulation Reference Signals (NR-DMRS) for a Physical Broadcast Channel (PBCH), encoding as cell identifier and/or a beam specific indication (such as e.g. a timer index) or CSI-RS, configured via dedicated signalling and being UE-specific.

There is a new aspect in NR that cell quality may be computed based on two types of RSs, namely NR-SS (basically the NR-PSS and/or the NR-SSS) and CSI-RS.

In order to configure an RS Type per reportConfig, the network node 110 may e.g. configure the UE 120 to measure SS Block based cell quality for a given reportConfig and CSI-RS based cell quality for another reportConfig although both may be linked to the same measObject via two different measurement IDs. For each RS type, the network node 110 may configure a separate list of cell-specific offsets. One way to implement this embodiment may be by the network node 110 defining cell-specific offsets per reportConfig, where the offsets are associated to the RSType that is being set defined per reportConfig. The UE 120 associates the offsets to the SS Block if the RSType IE is set to SS Block, while the UE 120 associates the offsets to CSI-RS if the RSType IE is set to CSI-RS in the reportConfig. The network node 110 may thus provide two reportConfig(s) to the UE 120, each a with a different RSType, one set to SS Block and another set to CSI-RS, and for each of them, the network node 110 may set different offsets per cell. The cell list may e.g. either be comprised in the measObject associated to the reportConfig or within the reportConfig.

Another way to implement the embodiment may be by defining cell-specific offsets within the measObject but per RSType. In other words, instead of a single offset being applied to any triggerQuantity that may be set in any linked reportConfig, the network node 110 may provide K offsets to the UE 120 instead, one for each RSType that may be set in the reportConfig. For example, if it in NR is possible to set as a trigger quantity SS Block or CSI-RS, the measObject may for each cell comprise two possible offsets per cell in the list and so on.

Combined RS Type and TriggerQuantity

In a further embodiment, the network node 110 may configure the UE 120 one or multiple offsets per cell, wherein each of these offsets is associated to a given triggerQuantity, which may be a quality measurement result, such as e.g. RSRP, RSRQ, SINR or similar, and an RS Type.

One way to implement this embodiment may be by defining cell-specific offsets per reportConfig where the offsets are associated to the configured triggerQuantity and the RSType, defined per reportConfig. For each of these there could be cell-specific offsets associated to a given setting so that there may be different settings for the different RS Types and trigger quantities. The cell list may either be comprised in the measObject associated to the reportConfig or within the reportConfig. By configuring a list of cell specific offsets per reportConfig the UE 120 may determine the association based on the RS Type and triggerQuantity set for the reportConfig.

Another way to implement this embodiment may be by defining cell-specific offsets within the measurement object but per triggerQuantity and RS Type combined, see e.g. table 4 as an example. In other words, instead of a single offset being applied to any trigger quantity that may be set in any linked reportConfig, the network node 120 may provide K offsets instead to the UE 120, one for each triggerQuantity and RS Type combination that may be set in the reportConfig. For example, in NR it may be possible to set as a trigger quantity RSRP, RSRQ or SINR, and an RS Type set as SS Block or CSI-RS, the measurement object may thus comprise for each cell the following possible measurement report triggering offsets:

One measurement report triggering offset with trigger-Quantity set to RSRP and RS-Type set to SS Block;

One measurement report triggering offset with trigger-Quantity set to RSRQ and RS-Type set to SS Block;

One measurement report triggering offset with trigger-Quantity set to RSRP and RS-Type set to CSI-RS;

One measurement report triggering offset with trigger-Quantity set to RSRQ and RS-Type set to CSI-RS;

In the example above, there would be four lists, each comprising one measurement report triggering offset for each combination of trigger quantity and RS-Type defined in the measurement object. Thereby a certain level of flexibility may be achieved.

The advantage of configuring the measurement report triggering offsets per reportConfig is that in addition to allowing the flexibility per triggerQuantity and/or RS Type it is also possible to have different offsets for different configured events, such as e.g. A1, A2, A3, A4, A5, A6, B1 and/or B2.

TABLE 4

Example of Measurement Object IE comprising offset parameters according to the embodiments herein.

| | | |
|---|---|---|
| MeasObjectEUTRA ::= | SEQUENCE { | |
| carrierFreq | ARFCN-ValueEYTRA, | |
| ... | | |
| offsetFreq-SS-Rsrp | Q-OffsetRange | DEFAULT dB0, |
| offsetFreq-SS-Rsrq | Q-OffsetRange | DEFAULT dB0, |
| offsetFreq-SS-SINR | Q-OffsetRange | DEFAULT dB0, |
| offsetFreq-CSI-RS-Rsrp | Q-OffsetRange | DEFAULT dB0, |
| offsetFreq-CSI-RS-Rsrq | Q-OffsetRange | DEFAULT dB0, |
| offsetFreq-CSI-RS-SINR | Q-OffsetRange | DEFAULT dB0, |
| -- Cell list | | |
| cellsToRemoveList | CellIndexList | OPTIONAL, -- Need ON |
| cellsToAddModList | CellsToAddModList | OPTIONAL, -- Need ON |
| -- Black list | | |
| blackCellsToRemoveList | CellIndexList | OPTIONAL, -- Need ON |
| blackCellsToAddModList | BlackCellsToAddModList | OPTIONAL, -- Need ON |
| cellForWhichToReportCGI | PhysCellId | OPTIONAL, -- Need ON |
| ..., | | |
| CellsToAddModList ::= | SEQUENCE (SIZE (1..maxCellMeas)) OF CellsToAddMod | |
| CellsToAddMod ::= SEQUENCE { | | |
| cellIndex | INTEGER (1..maxCellMeas), | |
| physCellId | PhysCellId, | |
| cellIndividualOffset-SS-Rsrp | Q-OffsetRange, | |
| cellIndividualOffset-SS-Rsrq | Q-OffsetRange, | |
| cellIndividualOffset-SS-SINR | Q-OffsetRange, | |
| cellIndividualOffset-CSI-RS-Rsrp | Q-OffsetRange, | |
| cellIndividualOffset-CSI-RS-Rsrq | Q-OffsetRange, | |
| cellIndividualOffset-CSI-RS-SINR | Q-OffsetRange, | |
| } | | |

Individual frequency offsets and cell specific offsets for different trigger quantities and RS types may be defined in the measurement object according to table 4. Each individual frequency offset and/or cell specific offset for different trigger quantities and RS types may herein also be referred to as a unique or different measurement. In table 4 the offset parameters as configured by the network node 110 according to the example embodiments herein are marked in bold. The example shown in table 4 indicates the presence of the parameters, the actual location within the message and the name of the parameters may however be different. In the example shown in table 4 individual measurement report triggering offsets are provided for different measurement objects and combinations RS-Type and trigger quantity, such as e.g. the individual measurement report triggering offset offsetFreq-SS-Rsrp which is defined for the frequency (Freq) as measurement object, with SS as RS-Type and RSRP as trigger quantity.

In another embodiment, to facilitate measurements with different thresholds on the same target frequency, the network node 110 may include a parameter in the report configuration specifying that the measurement offsets present in the measurement object shall be ignored for this measurement. An example of such a parameter is shown in Table 5 below, where a bitmap is used, with the first bit indicating if the relevant frequency offsets, based on RSType and triggerQuantity, shall be ignored and the second bit indicating if cellIndividualOffsets shall be ignored.
ReportConfigNR In the following an example of a Report Configuration IE which may be transmitted by the network node 110 to the UE 120, as defined in 3GPP TS 38.331 v. 0.0.4 (NR RRC specifications) for implementing the embodiments herein is disclosed. The Report Configuration IE may herein also be referred to as ReportConfigNR, in accordance with TS 38.331 v. 0.0.4 (NR RRC specifications). The network node 110 may send a configuration message to the UE 120 comprising the ReportConfigNR IE in order to configure the mobility measurements and the reporting of the mobility measurements for the UE 120. The IE ReportConfigNR specifies the criteria(s) for triggering of an NR measurement reporting event, i.e. when the UE 120 shall trigger a reporting of the measurements, such as mobility measurements. The measurement reporting events may be based on cell level measurements, which may either be derived based on CSI-RS or NR-SS. These measurement reporting events may e.g. be labelled AN, with N equal to 1, 2 and so on. In the following, example measurement reporting events according to the embodiments herein are disclosed:

Event A1: Serving cell becomes better than absolute threshold;

Event A2: Serving cell becomes worse than absolute threshold;

Event A3: Neighbour cell becomes amount of offset better than PCell and/or PSCell;

Event A4: Neighbour cell becomes better than absolute threshold;

Event A5: PCell and/or PSCell becomes worse than absolute threshold1 AND Neighbour cell becomes better than another absolute threshold2;

Event A6: Neighbour cell becomes amount of offset better than SCell.

| ReportConfigNR information element | |
| --- | --- |
| -- ANS1START | |
| ReportConfigNR ::= | SEQUENCE { |
|   triggerType | CHOICE { |
|     event | SEQUENCE { |
|       eventId | CHOICE { |
|         eventA1 | SEQUENCE { |
|           a1-Threshold | ThresholdNR |
|         }, | |
|         eventA2 | SEQUENCE { |
|           a2-Threshold | ThresholdNR |
|         }, | |
|         eventA3 | SEQUENCE { |
|           a3-Threshold | INTEGER (−30..30), |
|           reportOnLeave | BOOLEAN |
|         }, | |
|         eventA4 | SEQUENCE { |
|           a4-Threshold | ThresholdNR |
|         }, | |
|         eventA5 | SEQUENCE { |
|           a5-Threshold1 | ThresholdNR, |
|           a5-Threshold2 | ThresholdNR |
|         }, | |
|         ..., | |
|         eventA6 | SEQUENCE { |
|           a6-Offset | INTEGER (−30..30), |
|           a6-ReportOnLeave | BOOLEAN |
|         }, | |
|     }, | |
|     hysteresis | Hysteresis, |
|     timeToTrigger | TimeToTrigger |
|   }, | |
|   periodical | SEQUENCE { |
|     purpose | ENUMERATED { |
|     } | reportStrongestCell reportCGI} |
|   }, | |
|   RSType | ENUMERATED {ss, csi-rs} |
|   triggerQuantity | ENUMERATED {rsrp, rsrq, sinr} |
|   reportQuantity | ENUMERATED {sameAsTriggerQuantity,} |
| |     rsrpANDrsrq, rsrpANDsinr, |
| |     rsrqANDsinr, all}, |
| offsetIgnoreBitmap | BIT STRENGTH (SIZE(x)), |
| beamReportQuantity | ENUMERATED {sameAsTriggerQuantity,} |
| |     rsrpANDrsrq, rsrpANDsinr, |
| |     rsrqANDsinr, all, beamIndex}   OPTIONAL, |
|   maxReportBeams | INTEGER (1..maxBeamReport), |

| | |
|---|---|
| maxReportCells | INTEGER (1..maxCellReport), |
| reportInterval | ReportInterval, |
| reportAmount | ENUMERATED {r1, r2, r4, r8, r16, r32, r64, infinity}, |
| useAverageBeamsCellQuality | BOOLEAN          OPTIONAL, -- Need ON |

Beam Level Measurements

In NR, beam level measurements may be performed by the UE 120 to derive the cell quality. The cell quality in NR may be defined as:

The quality of the best beam, if the number of beams (N, which is configured per measObject, is not set (or is set to 1);

The quality of the best beam averaged with the other detected beams above an absolute threshold, also configured per measObject, where the total number of averaged beams cannot exceed N. The measurement offsets may also be configured based on the absolute threshold, i.e. no measurement report triggering offset may be defined for beams below the absolute threshold, while the measurement offsets may be configured in accordance with the other examples herein for the beams above the absolute threshold. In other words, the beams that are below the absolute threshold are not being considered by the UE 120 when performing the mobility measurements and/or the reporting of the mobility measurements.

In one embodiment herein, the network node 110 may configure the UE 120 with cell specific offsets for these cell quality derivation parameters per triggerQuantity and/or RS type. In other words, for a given cell, different parameters to be configured for each cell quality derivation parameter. In one example of this embodiment, the network node 110 may configure the offsets for the parameters N and the absolute threshold per reportConfig, which allows different settings for different RS Types and trigger quantities.

These cell quality derivation parameters may also be defined in the measurement object and allowing the measurement report triggering offsets to be set per RSType and triggerQuantity. The cell quality parameters may e.g. be defined and/or set by the network node 110.

In addition, the UE 120 may be configured to report beam level measurements associated to a given cell in the case when measurement reports are triggered based on cell quality. As described earlier, these may be based on RSs such as e.g. SS Block or CSI-RS. The UE 120 may e.g. be configured by the network node 110.

In the particular case of CSI-RS there may be the C1 and/or a C2 event(s), based on a single beam quality or based on a set of beam qualities. Hence, the principle described above for cell level measurements may also be applicable to beam level measurement results. For beam level measurement results, the measurement object may contain a list of CSI-RS resources associated to each cell and the cell-specific offsets may be defined per:

Configured CSI-RS resource;
Per trigger quantity; or
A combination of these.

In NR, the cell quality may further be derived by averaging the best beam associated to a given cell with the remaining N number of beams of that cell above a configurable absolute threshold. That absolute threshold, which may herein also be referred to an offset, and the parameter N may be configured per measurement object, i.e. they should be the same for all cells.

When beam level measurements are performed by the UE 120 the reporting format may also be changed such that the measurement report sent by the UE 120 to the network node 110 comprise the beam level quantities such as e.g. RSRP and/or RSRQ and/or SINR, and associated information, such as e.g. the number of beams to report.

For intra-frequency and inter-frequency measurements the measurement object may be associated to an NR downlink carrier frequency. Associated with this carrier frequency, the network may configure a list of 'blacklisted' cells and a list of 'whitelisted' cells. Blacklisted cells are not applicable in event evaluation or measurement reporting. Whitelisted cells are the only ones applicable in event evaluation and/or measurement reporting, i.e. the UE 120 only performs mobility measurement and mobility measurement reporting on the whitelisted cells. The blacklisted cells may be determined by setting the threshold for the cell quality derivation parameters, wherein cells below the threshold are blacklisted.

Table 5 discloses an example of the Report Configuration IE according to some embodiments herein, comprising a parameter indicating that the offsets specified in any measurement object shall be ignored for this measurement. This parameter is marked in bold and italic in the example shown in table 5. In the example disclosed in table 5 the presence of the parameter is indicated, however the actual location within the message and the name of the parameters may be different.

The proposed solution can be valid for both GUTRAN (NR) and EUTRAN (LTE) specifications. It may be applied both on intra-RAT and inter-RAT UE measurements, such as e.g. GUTRAN, EUTRAN, UTRAN and GERAN.

Example of embodiments of the method performed by the network node 110 for configuring mobility measurements for the UE 120 will now be described with reference to a flowchart depicted in FIG. 3.

Figure 3:
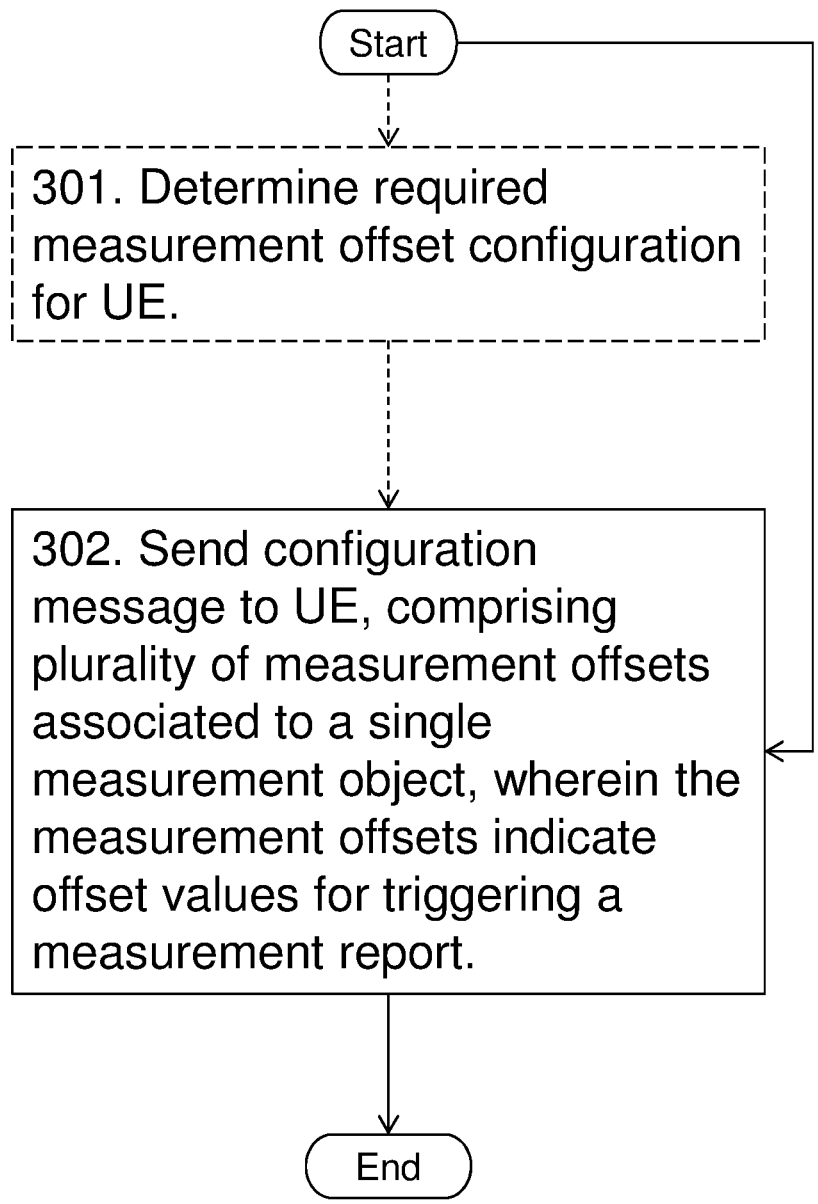
FIG. 3 is a flowchart depicting a method performed by the network node.

Dashed lines of a box in FIG. 3 indicate that this action is performed in only some embodiments and is not mandatory.

Action 301

The network node 110 may determine a required measurement offset configuration for the UE 120. This action 301 may e.g. be performed by a determining module comprised in the network node 110.

This action 301 is similar to the Action 201 described in relation to FIG. 2.

Action 302

The network node 110 sends a configuration message to the UE 120, wherein the configuration message comprises a plurality of measurement offsets associated to a single, which may also be referred to as a same, measurement object. The measurement offsets indicate offset values for triggering a measurement report. Hence, when a measurement reaches a threshold plus the offset configured for the measurement a transmission of a report of the transmission shall be triggered, which may also be referred to as shall be performed. Each of the plurality of measurement offsets being related to a respective measurement, which may also be referred to as a different or unique measurement. The term unique or different measurement may herein be interpreted as a unique combination of frequency offsets and cell specific offsets defined for different trigger quantities and RS types. This configuration message may be based on the determined required measurement configuration. This action 302 may e.g. be performed by a sending module being comprised in the network node 110. The measurement object may e.g. be the frequency for which the UE 120 shall perform the mobility measurements or the number of cells for which the UE 120 shall perform the mobility measurements or a combination thereof. Hence, the measurement object may comprise the frequency and/or the cells for which the UE 120 shall perform the mobility measurements.

The network node 110 may configure, which may herein also be referred to as define, the measurement report triggering offsets per trigger quantity or any other quality related metric. The trigger quantity may e.g. be RSRP, RSRQ and/or SINR.

The network node 110 may configure the measurement report triggering offsets per RS-type configured. The RS-type may e.g. be configured for the mobility measurements and/or the mobility measurement reporting from the UE 120. The RS-type may be an SS Block RS or a CSI-RS.

The network node 110 may configure the measurement report triggering offsets are configured per cell quality derivation parameter. The cell quality derivation parameter may e.g. be a maximum number of beams to be averaged or an absolute threshold to select suitable beams for averaging.

According to a further embodiment the network node 110 may define the measurement offsets per cell quality derivation parameter.

This action 302 is similar to the Action 202 described in relation to FIG. 2.

Example of embodiments of the method performed by the UE 120 for performing mobility measurements will now be described with reference to a flowchart depicted in FIG. 4. Dashed lines of a box in FIG. 4 indicate that this action is performed in only some embodiments and is not mandatory.

Action 401

The UE 120 receives a plurality of measurement offsets associated to a single measurement object. The measurement offsets indicate offset values for triggering a measurement report. Each of the plurality of measurement offsets is defined for a respective measurement to be performed by the UE 120.

The measurement offsets may e.g. be configured per trigger quantity. The trigger quantity may e.g. be an RSRP, an RSRQ, a SINR and/or any other quality related metric.

In some embodiments of the method according to the embodiments herein, measurement offsets may be configured, such as per RS-type configured for the UE 120. The RS-type may e.g. be an SS Block RS or a CSI-RS.

In some embodiments herein the measurement offsets may be configured per cell quality derivation parameter.

The measurement object may e.g. be a frequency for which the UE 120 shall perform the mobility measurements or a number of cells for which the UE 120 shall perform the mobility measurements.

In some embodiments herein the UE 120 may receive the plurality of measurement offsets in a configuration message from the network node 110.

This action 401 is similar to the Action 202 described in relation to FIG. 2.

Action 402

The UE 120 performs a mobility measurement process taking the measurement offset into account for triggering a measurement report transmission. In other words, when the measurement reaches a threshold plus the measurement offset, the UE 120 may transmit a report of the measurement to the network node 110.

This action 402 is similar to the Action 204 described in relation to FIG. 2.

Figure 5A:
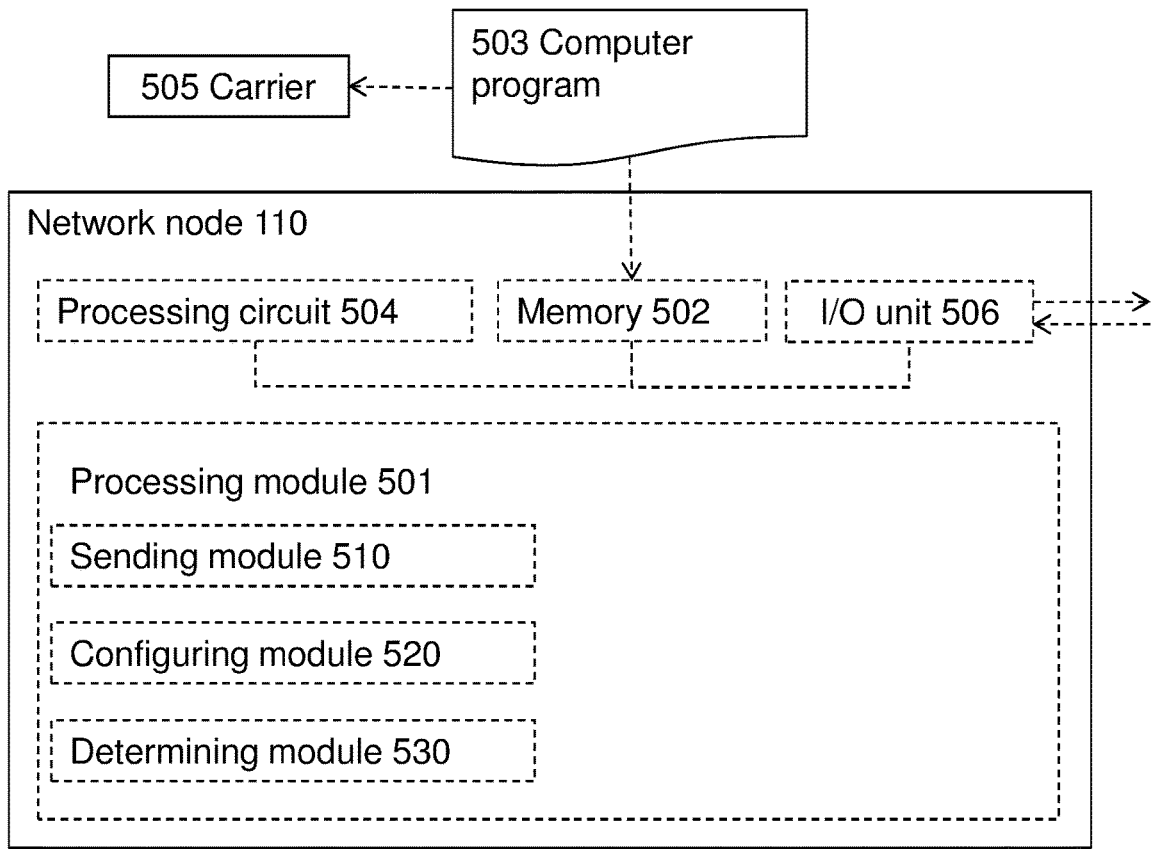
FIG. 5a is a schematic block diagram illustrating some first embodiments of a network node.

With reference to FIG. 5a, a schematic block diagram of embodiments of the network node 110 for performing the method of FIG. 3 is shown.

The network node may comprise a processing module 501, such as a means for performing the methods described herein. The means may be embodied in the form of one or more hardware modules and/or one or more software modules The network node may further comprise a memory 502. The memory may comprise, such as contain or store, instructions, e.g. in the form of a computer program product 503, which may comprise computer readable code units.

According to some embodiments herein, the network node and/or the processing module 501 comprises a processing circuit 504 as an exemplifying hardware module. Accordingly, the processing module 501 may be embodied in the form of, or 'realized by', the processing circuit 504. The instructions may be executable by the processing circuit 504, whereby the network node may be operative to perform the methods described herein and in particular the method described in relation to FIG. 3. As another example, the instructions, when executed by the network node 110 and/or the processing circuit 504, may cause the network node 110 to perform the method according to FIG. 3 and the further examples disclosed herein relating to the network node 110.

In view of the above, in one example, there is provided a network node 110 for configuring mobility measurements for a UE 120. As mentioned, the network node 110 may be configured to perform the method steps disclosed in relation to FIG. 3.

Again, the memory 502 may contain the instructions executable by said processing circuit 504 whereby the network node 110 may be operative for:
sending a configuration message to the UE 120, which configuration message comprises a plurality of measurement offsets associated to a single measurement object, wherein the measurement offsets indicates offset values for triggering a measurement report, and wherein each of the plurality of measurement offsets is related to a different measurement.

The memory 502 may further contain the instructions executable by said processing circuit 504, whereby the network node 110 may further be operative for:
determining a required measurement offset configuration for the UE 120. The measurement offset configuration may comprise measurement offsets associated to a single measurement object, wherein the measurement offsets indicates offset values for triggering a measurement report.

FIG. 5 further illustrates a carrier 505, or program carrier, which comprises the computer program 403 as described directly above.

In some embodiments, the processing module 501 comprises an Input/Output module 506, which may be exemplified by a receiving module and/or a sending module as described below when applicable.

In further embodiments, the network node 110 and/or the processing module 501 may comprise one or more of a sending module 510, a configuring module 520, and a determining module 530 as exemplifying hardware modules. In other examples, one or more of the aforementioned exemplifying hardware modules may be implemented as one or more software modules.

Accordingly, the network node 110 may be configured for sending, to the UE 120, a configuration message, which configuration message comprises a plurality of measurement offsets associated to the same measurement object, each of the plurality of measurement offsets being related to a different measurement.

Therefore, according to the various embodiments described above, the network node 110 and/or the processing module 501 and/or the sending module 510 may be configured to send a configuration message to the UE 120, which configuration message may comprise a plurality of measurement report triggering offsets associated to the same measurement object, each of the plurality of measurement report triggering offsets being related to a different measurement.

Furthermore, the network node 110 may be configured to determine a required measurement report triggering offset configuration for the UE 120.

Therefore, according to the various embodiments described above, the network node 110 and/or the processing module 501 and/or the determining module 530 may be configured to determine a required measurement report triggering offset configuration for the UE 120. The configuring module may herein also be referred to as a configuration module.

The network node 110 may further be configured to configure the measurement report triggering offsets per trigger quantity, such as RSRP, RSRQ, SINR or any other quality related metric.

Therefore, according to the various embodiments described above, the network node 110 and/or the processing module 501 and/or the configuring module 520 may be configured for configuring/to configure the measurement offsets per trigger quantity, such as RSRP, RSRQ, SINR or any other quality related metric.

The network node 110 may further be configured for configuring/to configure the measurement offsets per RS-type that is configured, such as e.g. SS Block RS or CSI-RS.

Therefore, according to the various embodiments described above, the network node 110 and/or the processing module 501 and/or the configuring module 520 may be configured for configuring/to configure the measurement offsets per RS-type that is configured, such as e.g. SS Block RS or CSI-RS. The network node 110 may configure the measurement offsets by setting the measurement offsets in the configuration message sent to the UE 120.

The network node 110 may further be configured for configuring/to configure the measurement offsets per cell quality derivation parameter, such as e.g. a maximum number of beams to be averaged or an absolute threshold to select suitable beams for averaging.

Therefore, according to the various embodiments described above, the network node 110 and/or the processing module 501 and/or the configuring module 520 may be configured for configuring/to configure the measurement offsets per cell quality derivation parameter, such as e.g. a maximum number of beams to be averaged or an absolute threshold to select suitable beams for averaging. The network node 110 may configure the measurement offsets by setting the measurement offsets in the configuration message sent to the UE 120.

The network node 110 may further be configured to set the measurement offsets to different values for each measurement identifier.

Therefore, according to the various embodiments described above, the network node 110 and/or the processing module 401 and/or the configuring module 420 may be configured to set the measurement offsets for triggering a measurement reporting to different values for each measurement identifier.

Figure 5B:
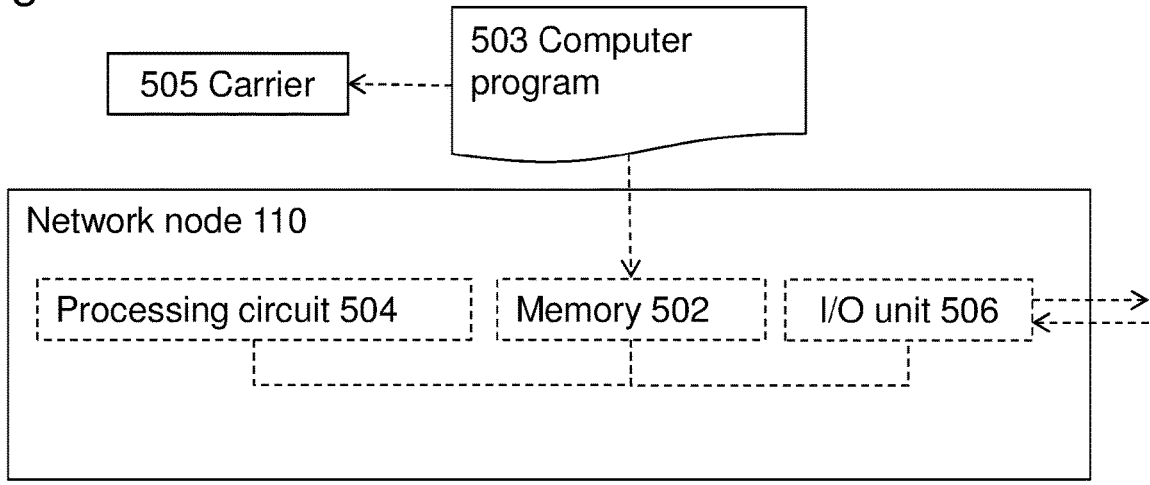
FIG. 5b is a schematic block diagram illustrating some second embodiments of the network node.

The embodiments herein may also be implemented through a respective processor or one or more processors of a processing circuitry in the network node 110 as depicted in FIG. 5b, which processing circuitry is configured to perform the method actions according to FIG. 3 and the embodiments described above for the network node 110.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as e.g. a memory stick. The computer program code may furthermore be provided as pure program code on a server and downloaded to the network node 110.

The network node 110 may further comprise the memory 502. The memory may comprise one or more memory units to be used to store data on, such as software, patches, system information, configurations, diagnostic data, performance data and/or applications to perform the methods disclosed herein when being executed, and similar.

The methods according to the embodiments described herein for the network 110 node may be respectively implemented by means of e.g. the computer program 503 or a computer program product, comprising instructions, i.e., software code portions, which, when executed on at least one processor, cause the at least one processor to carry out the actions described herein, as performed by the network node 110. The computer program 503 may be stored on a computer-readable storage medium, e.g. the carrier 505, a disc or similar. The computer-readable storage medium, having stored thereon the computer program, may comprise the instructions which, when executed on at least one processor, cause the at least one processor to carry out the actions described herein, as performed by the network node 110. In some embodiments, the computer-readable storage medium may be a non-transitory computer-readable storage medium.

Those skilled in the art will also appreciate that the Input/Output module 506, the processing module 501, the sending module 510, the configuring module 520, the determining module 530, described above may refer to a combination of analog and digital circuits, and/or one or more processors configured with software and/or firmware, e.g. stored in the memory 502, that when executed by the one or more processors such as the processing unit as described above perform actions according to any of the above actions as performed by the network node 110. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The proposed solution may also be applicable for cloud implementation of eNB/gNB as well distributed implementation.

The network node 110 described in the embodiments herein may also be implemented by means of resources in a cloud-like environment, commonly referred to as "the cloud". Although the method actions performed by the network node 110 herein are discussed in the context of a radio access node, the method may also be performed by a core network node or a distributed node comprised in a first cloud, such as e.g. a server and/or a data center. The method actions may e.g. be performed by a logical function, which may be a centralized service hosted on the core network node or the distributed node.

Figure 4:
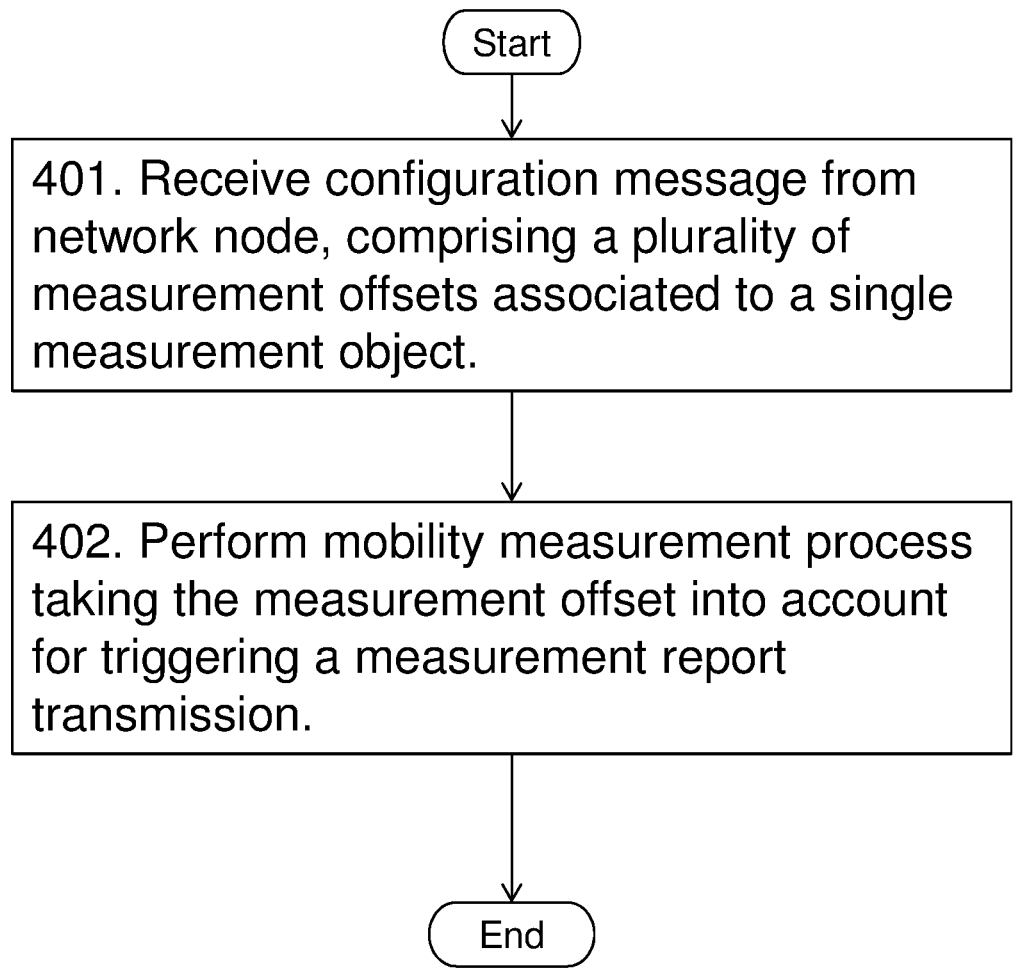
FIG. 4 is a flowchart depicting a method performed by the UE.
Figure 6A:
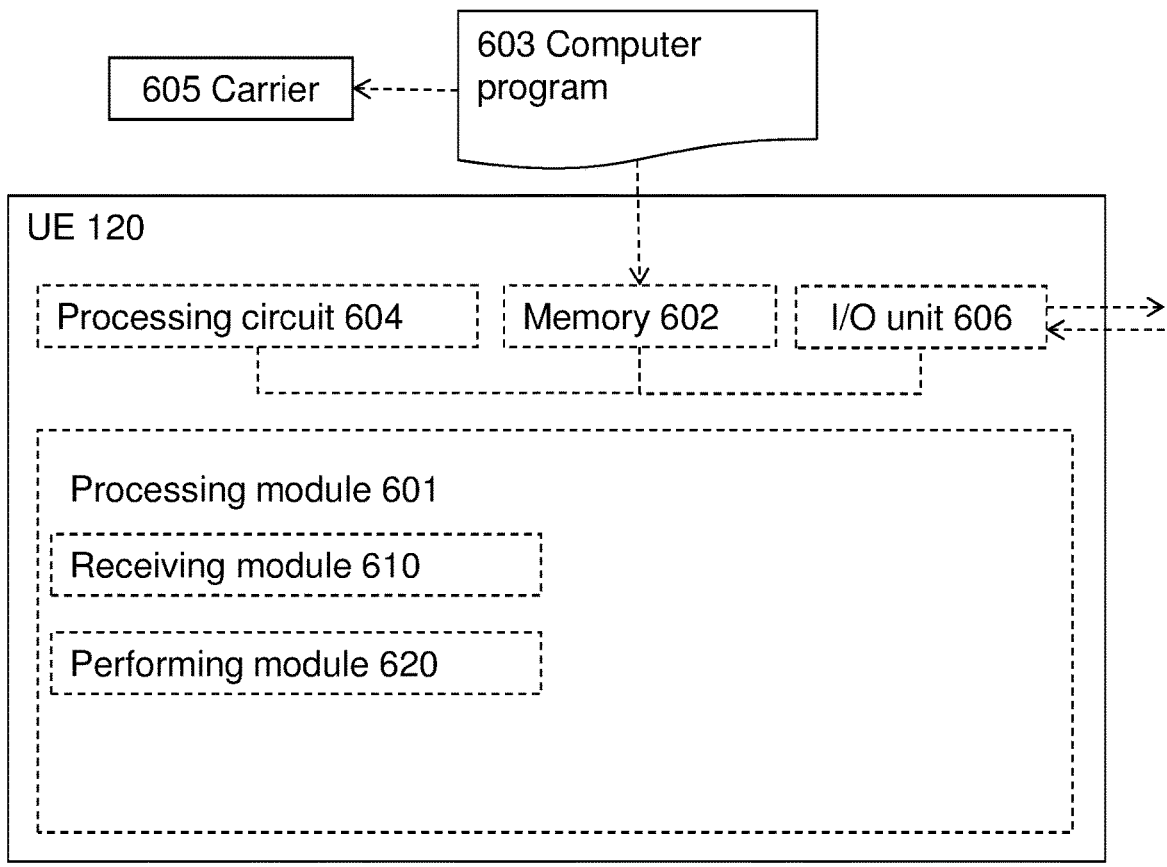
FIG. 6a is a schematic block diagram illustrating some first embodiments of a UE.

With reference to FIG. 6a, a schematic block diagram of a first embodiment of the UE 120 for performing the method of FIG. 4 is shown.

The UE 120 may comprise a processing module 601, such as a means for performing the methods described herein. The means may be embodied in the form of one or more hardware modules and/or one or more software modules The UE 120 may further comprise a memory 602. The memory may comprise, such as contain or store, instructions, e.g. in the form of a computer program 603, which may comprise computer readable code units.

According to some embodiments herein, the UE 120 and/or the processing module 601 comprises a processing circuit 604 as an exemplifying hardware module. Accordingly, the processing module 601 may be embodied in the form of, or 'realized by', the processing circuit 504. The instructions may be executable by the processing circuit 604, whereby the network node may be operative to perform the methods described herein and in particular the method described in relation to FIG. 4. As another example, the instructions, when executed by the UE 120 and/or the processing circuit 604, may cause the UE 120 to perform the method according to FIG. 4 and the further examples disclosed herein.

In view of the above, in one example, there is provided a UE 120 for performing mobility measurements. As mentioned, the UE 120 may be configured to perform the method steps disclosed in relation to FIG. 4.

Again, the memory 602 may contain the instructions executable by said processing circuit 604 whereby the UE 120 may be operative for:
  receiving a plurality of measurement offsets associated to a single measurement object, wherein the measurement offsets indicate offset values for triggering a measurement report. Each of the plurality of measurement offsets is defined for a respective measurement to be performed by the UE 120.

The memory 602 may further contain the instructions executable by said processing circuit 604, whereby the UE 120 may further be operative for:
  performing a mobility measurement process taking the measurement offset into account for triggering a measurement report transmission.

FIG. 6a further illustrates a carrier 605, or program carrier, which comprises the computer program 603 as described directly above.

In some embodiments, the processing module 601 comprises an Input/Output module 606, which may be exemplified by a receiving module and/or a performing module as described below when applicable.

In further embodiments, the UE 120 and/or the processing module 601 may comprise one or more of a receiving module 610, and a performing module 620 as exemplifying hardware modules. In other examples, one or more of the aforementioned exemplifying hardware modules may be implemented as one or more software modules.

Accordingly, the UE 120 may be configured to receive a plurality of measurement offsets associated to a single measurement object, wherein the measurement offsets indicate offset values for triggering a measurement report, and wherein each of the plurality of measurement offsets is defined for a respective measurement to be performed by the UE 120.

Therefore, according to the various embodiments described above, the UE 120 and/or the processing module 601 and/or the receiving module 610 may be configured to receive a plurality of measurement offsets associated to a single measurement object, wherein the measurement offsets indicate offset values for triggering a measurement report, and wherein each of the plurality of measurement offsets is defined for a respective measurement.

Furthermore, the UE 120 may be configured to receive the plurality of measurement offsets in a configuration message received from the network node 110.

Therefore, according to the various embodiments described above, the UE 120 and/or the processing module 601 and/or the receiving module 610 may be configured to receive the plurality of measurement offsets in a configuration message received from the network node 110.

Furthermore, the UE 120 may be configured to perform a mobility measurement process taking the measurement offset into account for triggering a measurement report transmission. This may also be referred to as the UE 120 being configured to perform mobility measurement reporting based on the plurality of measurement offsets.

Therefore, according to the various embodiments described above, the UE 120 and/or the processing module 601 and/or the performing module 620 may be configured to perform mobility measurement reporting based on the plurality of measurement offsets.

Figure 6B:
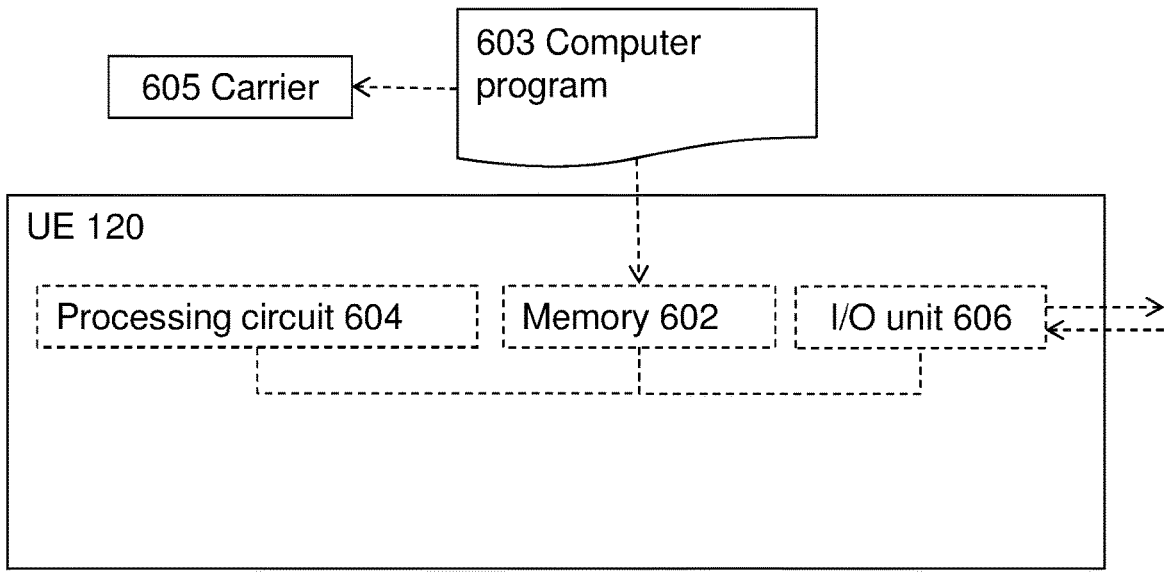
FIG. 6b is a schematic block diagram illustrating some second embodiments of the UE.

The embodiments herein may also be implemented through a respective processor or one or more processors of a processing circuitry 604 in the UE 120 as depicted in FIG. 6b, which processing circuitry is configured to perform the method actions according to FIG. 4 and the embodiments described above for the UE 120.

The embodiments may be performed by the processor together with respective computer program code for performing the functions and actions of the embodiments herein. The program code mentioned above may also be provided as a computer program product, for instance in the form of a data carrier 605 carrying computer program code for performing the embodiments herein when being loaded into the network node 110. One such carrier may be in the form of a CD ROM disc. It is however feasible with other data carriers such as e.g. a memory stick. The computer program code may furthermore be provided as pure program code on a server and downloaded to the UE 120.

The UE 120 may further comprise the memory 602. The memory may comprise one or more memory units to be used to store data on, such as software, patches, system information, configurations, diagnostic data, performance data and/or applications to perform the methods disclosed herein when being executed, and similar.

The methods according to the embodiments described herein for the UE 120 may be respectively implemented by means of e.g. a computer program or a computer program product, comprising instructions, i.e., software code portions, which, when executed on at least one processor, cause the at least one processor to carry out the actions described herein, as performed by the UE 120. The computer program may be stored on a computer-readable storage medium, e.g. a disc or similar. The computer-readable storage medium, having stored thereon the computer program, may comprise the instructions which, when executed on at least one processor, cause the at least one processor to carry out the actions described herein, as performed by the UE 120. In some embodiments, the computer-readable storage medium may be a non-transitory computer-readable storage medium.

Those skilled in the art will also appreciate that the Input/Output module 606, the processing module 601, the receiving module 610, the performing module 620, described above may refer to a combination of analog and digital circuits, and/or one or more processors configured with software and/or firmware, e.g. stored in the memory 602, that when executed by the one or more processors such as the processing unit as described above perform actions according to any of the above actions as performed by the UE 120. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

APPENDIX 1

| MeasObjectEUTRA information element |
|---|

```
-- ASN1START
MeasObjectEUTRA ::=                     SEQUENCE {
    carrierFreq                         ARFCN-ValueEUTRA,
    allowedMeasBandwidth                AlowedMassBandwidth,
    presenceAntennaPort1                PresenceAntennaPort1,
    neighCellConfig                     NeighCellConfig,
    offsetFreq                          Q-OffsetRange                   DEFAUL dB0,
    -- Cell List
    cellToRemoveList                    CellIndexList                   OPTIONAL,       -- Need
ON
    cellsToAddModList                   CellsToAddModList               OPTIONAL,       -- Need
ON
    -- BlackList
    blackCellsToRemoveList              CellIndexList                   OPTIONAL,       -- Need
ON
    blackCellsToAddModList              BlackCellsToAddModList          OPTIONAL,       -- Need
ON
    cellForWhichToReportCGI             PhysCellId                      OPTIONAL,       -- Need
ON
    ...,
    [[measCycleSCell-r10                MeasCycleSCell-r10              OPTIONAL,       -- Need ON
        measSubframePatternConfigNeigh-r10   MeasSubframePatternConfigNeigh-r10         OPTIONAL
                    -- Need ON
    ]],
    [[widebandRSRQ-Meas-r11             BOOLEAN OPTIONAL                -- Cond WB-RSRQ
    ]],
    [[  altTTT-CellsToRemoveList-r12    CellIndexList                   OPTIONAL,       -- Need
ON
        altTTT-CellsToAddModList-12     AltTTT-CellsToAddModList-r12    OPTIONAL,       --
NEED ON
        t312-r12                        CHOICE {
            release                         NULL,
            setup                           ENUMERATED {ms0, ms50, ms100, ms200,
                                                ms300, ms400, ms500, ms1000}
        }                                                               OPTIONAL,       -- Need ON
        reduceMeasPerformance-r12       BOOLEAN                         OPTIONAL,       -- Need
ON
        measDS-Config-r12               MeasDS-Config-r12               OPTIONAL,       -- Need
ON
    ]],
    [[
        whiteCellsToRemoveList-r13      CellIndexList                   OPTIONAL,       -- Need
ON
        whiteCellsToAddModList-r13      WhiteCellsToAddModList-r13      OPTIONAL,       -- Need
ON
        rmtc-Config-r13                 RMTC-Config-r13                 OPTIONAL,       -- Need ON
        carrierFreq-r13                 ARFCN-ValueEUTRA-v9e0           OPTIONAL        --
Need ON
    ]]
}
MeasObjectEUTRA-v9e0 ::=                SEQUENCE {
    carrierFreq-c9e0                    ARFCN-ValueEUTRA-v9e0
}
CellsToAddModList ::=                   SEQUENCE (SIZE (1..maxCellMeas)) OF CellsToAddMod
CellsToAddMod ::= SEQUENCE {
    cellIndex                           INTEGER (1..maxCellMeas),
    physCellId                          PhysCellId,
    cellIndividualOffset                Q-OffsetRange
}
BlackCellsToAddModList ::=              SEQUENCE (SIZE (1..maxCellMeas)) OF BlackCellsToAddMod
BlackCellsToAddMod ::= SEQUENCE {
    cellIndex                           INTEGER (1..maxCellMeas),
```

APPENDIX 1-continued

```
    physCellIdRange                 PhysCellIdRange
}
MeasCycleSCell-r10 ::=              ENUMERATED {sf160, sf,256, sf320, sf512,
                                                sf640, sf1024, sf1280, sparel}
MeasSubframePatternConfigNeigh-r10 ::= CHOICE {
    release                         NULL,
    setup                           SEQUENCE {
      measSubframePatternNeigh-r10      MeasSubframePattern-r10,
      measSubframeCellList-r10          MeasSubframeCellList-r10    OPTIONAL    --
Cond always
    }
}
MeasSubframeCellList-r10 ::=        SEQUENCE (SIZE (1..maxCellMeas)) OF PhysCellIdRange
AltTTT-CellsToAddModList-r12 ::=    SEQUENCE (SIZE (1..maxCellMeas)) OF AltTTT-
CellsToAddMod-r12
AltTTT-CellsToAddMod-r12 ::=        SEQUENCE {
    cellIndex-r12                     INTEGER (1..maxCellMeas),
    physCellIdRange-r12               PhysCellIdRange
}
WhiteCellsToAddModList-r13 ::=      SEQUENCE (SIZE (1..maxCellMeas)) OF
WhiteCellsToAddMod-r13
WhiteCellsToAddMod-r13 ::= SEQUENCE {
    cellIndex-r13                     INTEGER (1..maxCellMeas),
    physCellIdRange-r13               PhysCellIdRange
}
RMTC-Config-r13 ::= CHOICE {
    release                         NULL,
    setup                           SEQUENCE {
                                    ENUMERATED {ms40, ms80, ms160, ms320, ms640},
                                    INTEGER (0..639)               OPTIONAL,    --
Need ON
    measDuration-r13
    ...
    }
}
-ASN1STOP
```

The invention claimed is:

1. A User Equipment, UE, for performing mobility measurements, wherein the UE comprises memory and a processing circuit, the memory containing instructions executable by the processing circuit whereby the UE is configured to:
   receive a plurality of measurement offsets associated to a single measurement object, wherein the measurement offsets indicate offset values for triggering a measurement report, wherein each of the plurality of measurement offsets is related to a respective measurement, and wherein the measurement offsets are configured per Reference Signal type, RS-type, configured for mobility measurements for the UE; and
   perform a mobility measurement process taking the measurement offsets into account for triggering a measurement report transmission.

2. The UE of claim 1, wherein the UE is configured to:
   receive the plurality of measurement offsets in a configuration message from a network node.

3. The UE of claim 1, wherein the measurement offsets are configured per trigger quantity.

4. The UE of claim 3, wherein trigger quantities include a first trigger quantity from among a Reference Signal Received Power, RSRP, a Reference Signal Received Quality, RSRQ, and a Signal-to-Interference-plus-Noise Ratio, SINR, and a second trigger quantity from among an RSRP, an RSRQ, and an SINR, wherein the second trigger quantity is different from the first trigger quantity, such that at least one of the plurality of measurement offsets associated to the single measurement object is configured for the first trigger quantity and at least one of the plurality of measurement offsets associated to the single measurement object is configured for the second trigger quantity.

5. The UE of claim 1, wherein Reference Signal types configured for mobility measurements for the UE include at least a Synchronization Signal (SS) Block Reference Signal (RS) and a Channel State Information Reference Signal (CSI-RS), such that at least one of the plurality of measurement offsets associated to the single measurement object is configured for an SS Block RS and at least one of the plurality of measurement offsets associated to the single measurement object is configured for a CSI-RS.

6. The UE of claim 1, wherein the measurement offsets are configured per cell quality derivation parameter, wherein cell quality derivation parameters include at least a maximum number of beams to be averaged and an absolute threshold to select beams for averaging, such that at least one of the plurality of measurement offsets associated to the single measurement object is configured for a maximum number of beams to be averaged and at least one of the plurality of measurement offsets associated to the single measurement object is configured for an absolute threshold to select beams for averaging.

7. The UE of claim 1, wherein the measurement object comprises a frequency for which the UE shall perform the mobility measurements.

8. The UE of claim 1, wherein the measurement object comprises a number of cells for which the UE shall perform the mobility measurements.

9. The UE of claim 1, wherein separate lists of one or more measurement offsets is defined for different respective types of Reference Signals.

10. The UE of claim 1, wherein the measurement offsets are defined per reporting configuration, and wherein different reporting configurations are associated with different respective Reference Signal types.

11. The UE of claim 1, wherein the single measurement object defines a respective measurement offset for each of multiple Reference Signal types.

12. A method, performed by a User Equipment, UE, for performing mobility measurements, wherein the method comprises:
receiving a plurality of measurement offsets associated to a single measurement object, wherein the measurement offsets indicate offset values for triggering a measurement report, wherein each of the plurality of measurement offsets is defined for a respective measurement, and wherein the measurement offsets are configured per Reference Signal type, RS-type, configured for mobility measurements for the UE; and
performing a mobility measurement process taking the measurement offset into account for triggering a measurement report transmission.

13. The method according to claim 12, wherein the measurement offsets are configured per trigger quantity.

14. The method according to claim 13, wherein trigger quantities include a first trigger quantity from among a Reference Signal Received Power, RSRP, a Reference Signal Received Quality, RSRQ, and a Signal-to-Interference-plus-Noise Ratio, SINR, and a second trigger quantity from among an RSRP, an RSRQ, and an SINR, wherein the second trigger quantity is different from the first trigger quantity, such that at least one of the plurality of measurement offsets associated to the single measurement object is configured for the first trigger quantity and at least one of the plurality of measurement offsets associated to the single measurement object is configured for the second trigger quantity.

15. The method according to claim 12, wherein Reference Signal types configured for mobility measurements for the UE include at least a Synchronization Signal (SS) Block Reference Signal (RS) and a Channel State Information Reference Signal (CSI-RS), such that at least one of the plurality of measurement offsets associated to the single measurement object is configured for an SS Block RS and at least one of the plurality of measurement offsets associated to the single measurement object is configured for a CSI-RS.

16. The method according to claim 12, wherein the measurement offsets are configured per cell quality derivation parameter, wherein cell quality derivation parameters include at least a maximum number of beams to be averaged and an absolute threshold to select beams for averaging, such that at least one of the plurality of measurement offsets associated to the single measurement object is configured for a maximum number of beams to be averaged and at least one of the plurality of measurement offsets associated to the single measurement object is configured for an absolute threshold to select beams for averaging.

17. The method according to claim 12, wherein the measurement object comprises a frequency for which the UE shall perform the mobility measurements.

18. The method according to claim 12, wherein the measurement object comprises a number of cells for which the UE shall perform the mobility measurements.

19. The method according to claim 12, wherein the UE receives the plurality of measurement offsets in a configuration message from a network node.

20. A network node for configuring mobility measurements for a user equipment (UE), wherein the network node comprises memory and a processing circuit, the memory containing instructions executable by the processing circuit whereby the network node is configured to:
send a configuration message to the UE, wherein the configuration message comprises a plurality of measurement offsets associated to a single measurement object, wherein the measurement offsets indicate offset values for triggering a measurement report, wherein each of the plurality of measurement offsets is related to a respective measurement, and wherein the network node is configured to define the measurement offsets per Reference Signal type, RS-type, configured for mobility measurements for the UE.

21. The network node according to claim 20, wherein the network node is configured to define the measurement offsets per trigger quantity, wherein trigger quantities include a first trigger quantity from among a Reference Signal Received Power, RSRP, a Reference Signal Received Quality, RSRQ, and a Signal-to-Interference-plus-Noise Ratio, SINR, and a second trigger quantity from among an RSRP, an RSRQ, and an SINR, wherein the second trigger quantity is different from the first trigger quantity, such that at least one of the plurality of measurement offsets associated to the single measurement object is configured for the first trigger quantity and at least one of the plurality of measurement offsets associated to the single measurement object is configured for the second trigger quantity.

22. The network node according to claim 20, wherein Reference Signal types configured for mobility measurements for the UE include at least a Synchronization Signal (SS) Block Reference Signal (RS) and a Channel State Information Reference Signal (CSI-RS), such that at least one of the plurality of measurement offsets associated to the single measurement object is configured for an SS Block RS and at least one of the plurality of measurement offsets associated to the single measurement object is configured for a CSI-RS.

23. The network node according to claim 20, wherein the network node is configured to define the measurement offsets per cell quality derivation parameter, wherein cell quality derivation parameters include at least a maximum number of beams to be averaged and an absolute threshold to select beams for averaging, such that at least one of the plurality of measurement offsets associated to the single measurement object is configured for a maximum number of beams to be averaged and at least one of the plurality of measurement offsets associated to the single measurement object is configured for an absolute threshold to select beams for averaging.

24. The network node according to claim 20, wherein the network node is configured to set the measurement offsets to different values for each measurement identifier.

25. A method, performed by a network node, for configuring mobility measurements for a User Equipment, UE, wherein the method comprises:
sending a configuration message to the UE, wherein the configuration message comprises a plurality of measurement offsets associated to a single measurement object, wherein the measurement offsets indicate offset values for triggering a measurement report, wherein each of the plurality of measurement offsets is related to a respective measurement, and wherein the measurement offsets are configured per Reference Signal type, RS-type, configured for mobility measurements for the UE.

26. A non-transitory computer-readable storage medium, having stored thereon a computer program product comprising instructions which, when executed on at least one processor of a User Equipment, UE, cause the UE to:

receive a plurality of measurement offsets associated to a single measurement object, wherein the measurement offsets indicate offset values for triggering a measurement report, wherein each of the plurality of measurement offsets is related to a respective measurement, and wherein the measurement offsets are configured per Reference Signal type, RS-type, configured for mobility measurements for the UE; and perform a mobility measurement process taking the measurement offsets into account for triggering a measurement report transmission.

27. A non-transitory computer-readable storage medium, having stored thereon a computer program product comprising instructions which, when executed on at least one processor of a network node, cause the network node to:

send a configuration message to a user equipment, UE, wherein the configuration message comprises a plurality of measurement offsets associated to a single measurement object, wherein the measurement offsets indicate offset values for triggering a measurement report, wherein each of the plurality of measurement offsets is related to a respective measurement, and wherein the measurement offsets are configured per Reference Signal type, RS-type, configured for mobility measurements for the UE.

* * * * *